(12) United States Patent
Crawford

(10) Patent No.: US 8,381,684 B2
(45) Date of Patent: Feb. 26, 2013

(54) ANIMAL FEEDING BOWL

(75) Inventor: Stephen W. Crawford, Spring, TX (US)

(73) Assignee: Stephen W. Crawford, Spring, TX (US)

( * ) Notice: Subject to any disclaimer, the term of this patent is extended or adjusted under 35 U.S.C. 154(b) by 218 days.

(21) Appl. No.: 12/841,574

(22) Filed: Jul. 22, 2010

(65) Prior Publication Data

US 2012/0017837 A1    Jan. 26, 2012

(51) Int. Cl.
*A01K 5/01* (2006.01)
(52) U.S. Cl. ..................................... 119/61.5; 119/61.1
(58) Field of Classification Search .............. 119/61.1, 119/61.5, 61.54, 61.55
See application file for complete search history.

(56) References Cited

U.S. PATENT DOCUMENTS

| | | | | |
|---|---|---|---|---|
| 4,364,335 A | * | 12/1982 | Livingston | 119/61.1 |
| 5,479,882 A | * | 1/1996 | Kerner | 119/61.1 |
| 6,055,773 A | * | 5/2000 | Yang | 47/65.5 |
| 6,314,911 B1 | | 11/2001 | Kaytovich | |
| 6,539,893 B1 | * | 4/2003 | Otto-Lubker et al. | 119/61.5 |
| 6,848,392 B1 | * | 2/2005 | Kreutzer, Jr. | 119/61.3 |
| 7,753,000 B1 | * | 7/2010 | Turner | 119/61.2 |
| 7,856,944 B1 | * | 12/2010 | Stauffer | 119/61.5 |
| 8,082,882 B1 | * | 12/2011 | Tharp | 119/60 |

\* cited by examiner

*Primary Examiner* — Yvonne Abbott
(74) *Attorney, Agent, or Firm* — Wong, Cabello, Lutsch, Rutherford & Brucculeri, LLP

(57) ABSTRACT

An animal feeding structure can include one or more openings to drain water that is sprayed into the feeding structure in order to clean it. By draining the incident water, the remaining dirt, food and other particles are drained and removed from the feeding structure, thereby cleaning the structure without direct handling. Also, because the water is drained, water bounce back onto the person cleaning the bowl can be greatly reduced. The feeding structure can include an opening covered by a raised cap whose clearance from the bottom of the bowl can be adjusted. The feeding bowl can also include lateral and/or longitudinal slits of various sizes and shapes. The size and shape of openings can be designed to prevent food from falling out while allowing water, food crumbs, dirt, and debris to drain out. The effective size of the openings can be adjusted.

18 Claims, 4 Drawing Sheets

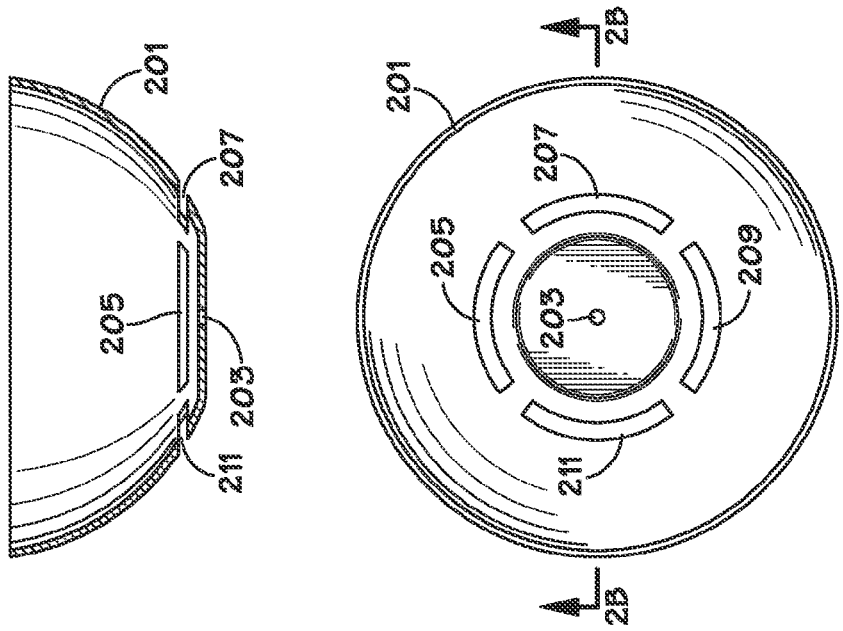
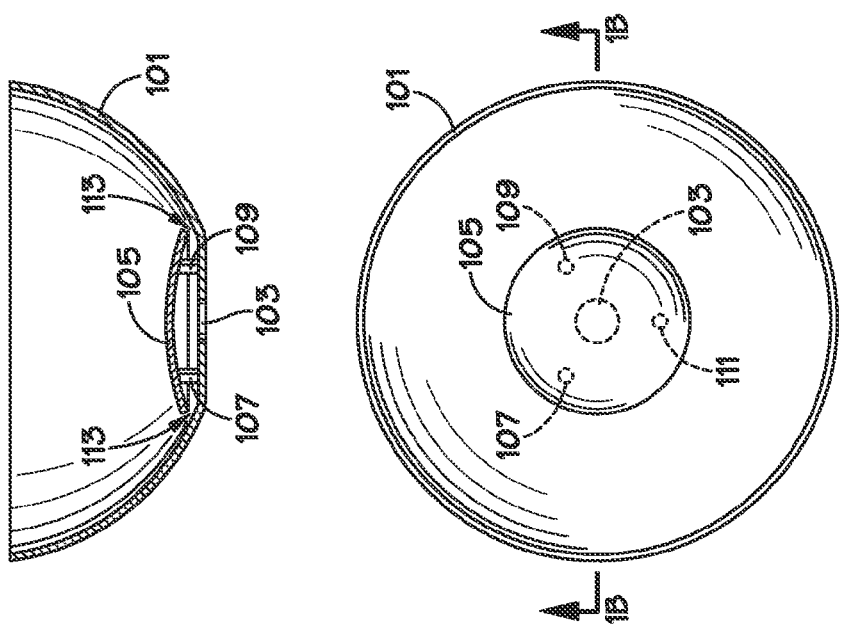

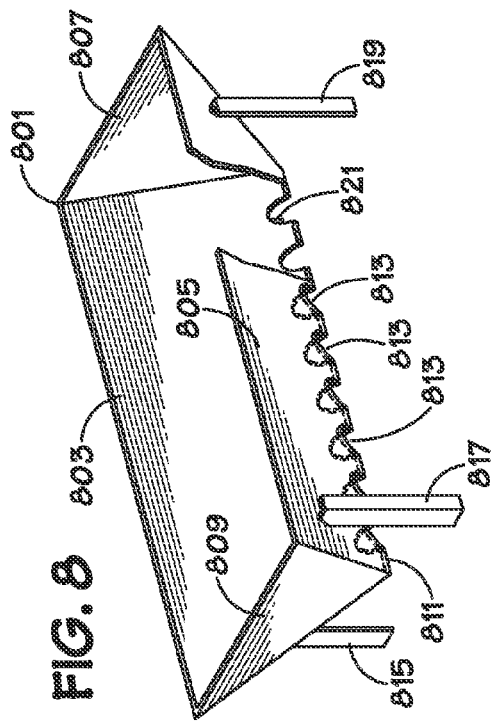
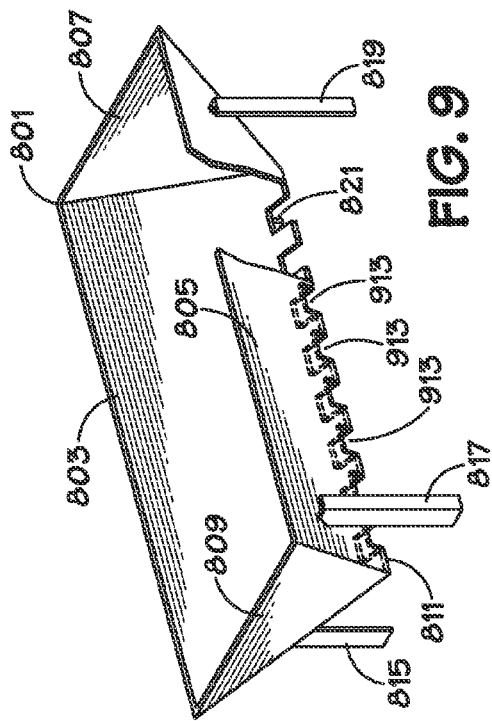
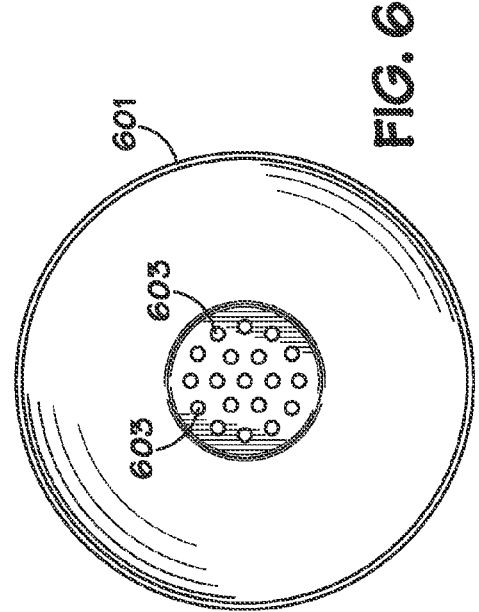
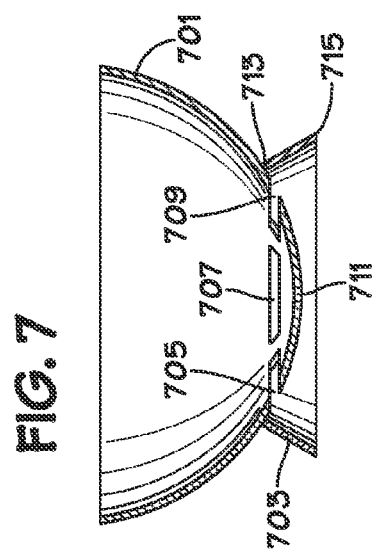

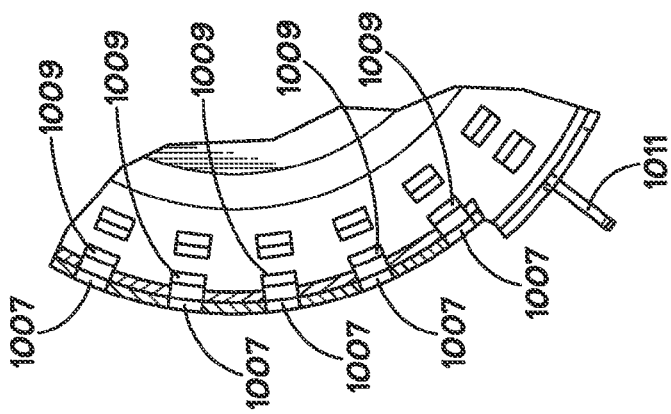
FIG. 10D
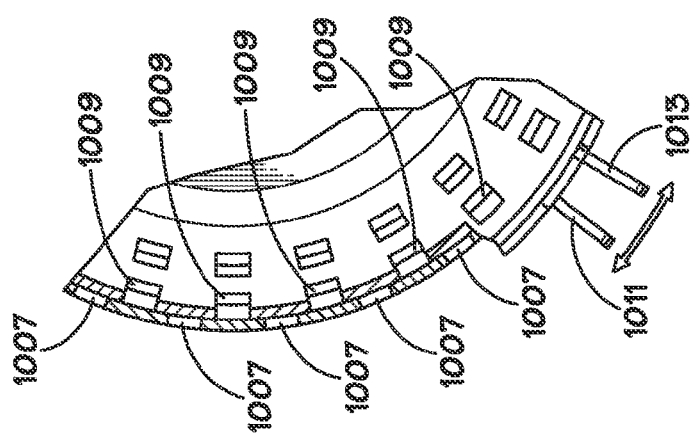
FIG. 10C
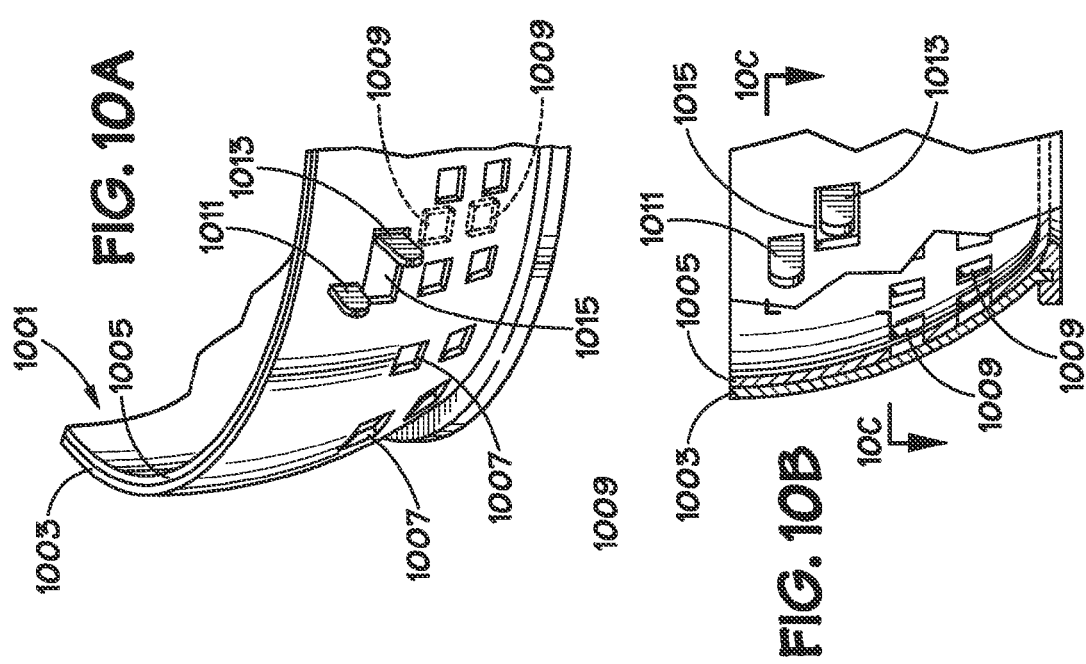
FIG. 10A
FIG. 10B

ANIMAL FEEDING BOWL

BACKGROUND OF THE INVENTION

1. Field of the Invention

The present invention relates generally to animal feeding structures. Particularly, the present invention relates to apparatus and methods for cleaner and easier to maintain pet feeding bowls.

2. Description of the Related Art

Traditional pet feeding bowls are typically a solid hemispherical structure to hold pet food. The pet owner can place food in the bowl's cavity for consumption by the pet. Invariably, the food placed in the bowl is not completely consumed by the pet. For example, small crumbs of pet food are left over on the bottom or the sides of the feeding bowl. Additionally, pet saliva can make the food crumbs adhere to the inside of the bowl. Eventually, dirt and dust can also stick and dry on the bowl's inner surface and on the leftover food—especially when the bowl is placed outdoors. When outdoors, this issue is exacerbated by factors such as morning dew and light rain. The resulting contamination reduces the sanitation of the feeding bowl. Eating out of the dirty bowl may result in dirt getting into the pet's mouth, damaging its teeth, and/or causing digestive issues.

Therefore, it is incumbent upon the pet owner to keep the feeding bowl as clean as possible. A typical method of cleaning a dirty feeding bowl, especially outdoors, is to use a water stream (e.g., hose) to spray the inner surface of the bowl with water while holding the bowl. Although this method may force the dried dirt and food crumbs off of the inner surface of the bowl, the method suffers from the sprayed water getting on the pet owner, both directly and by bouncing back onto the pet owner, and getting other areas wet. Indeed, because the bowl is solid (and substantially concave), water sprayed into the bowl has the tendency to bounce back at the sprayer—getting the pet owner wet. A light spray may not bounce back, but may be ineffective in dislodging dirt and also tends to result in a sprayed mist. As an alternative, the pet owner can place the feeding bowl on the ground and then spray it with water. Although this may avoid the water bounce back to the sprayer, the bowl will still be left with water in it. The pet owner would then have to bend down, handle the bowl and dump the water out. In any case, the pet owner will often get his/her hands, clothes, and shoes wet.

SUMMARY OF THE INVENTION

A pet feeding structure is disclosed that is easy to clean and maintain. The pet feeding structure can be in the form of a bowl, and can include openings that can allow water (including dew, snow, and rainwater), food crumbs, dirt, and debris to drain out of the feeding bowl. The openings also significantly facilitate the cleaning process. The openings can allow water being sprayed to clean the inside of the feeding bowl to drain out of the bowl, thereby reducing the water bouncing back onto the pet owner cleaning the bowl and relieving the pet owner from having to handle the bowl at all. The feeding bowl can be used to feed pets either indoors or outdoors.

In one aspect, the feeding bowl can include an opening at the bottom of the feeding bowl. The feeding bowl can also include a cap placed over the opening. The cap can be raised above the bottom of the feeding bowl such that a gap is formed between the periphery of the cap and the inner surface of the feeding bowl. The gap can be small enough to prevent pet food to pass through, but large enough to allow water, food crumbs, dirt, and debris to pass through and drain out of the opening at the bottom. The cap can be raised or lowered to increase or decrease the gap between its periphery and the inner surface of the bowl.

In another aspect, the feeding bowl can include horizontally oriented slits along the surface of the bowl in addition to an opening at the bottom of the bowl. The slits can also be oriented vertically, and can have various shapes, such as tapered, rectangular, etc.

In another aspect, the feeding bowl can include several openings distributed over the entire surface of the feeding bowl. The openings can be of the same or different sizes and shapes. The number, size, and shape of the openings can be designed to prevent pet food from falling through them, while allowing water, food crumbs, dirt, and debris to pass through. The openings can also be designed to efficiently drain water sprayed onto the inner surface of the feeding bowl so that the draining water carries out the remaining dirt and food particles, thereby cleaning the bowl without handling.

In another aspect, a feeding bowl can have adjustable openings. An inner bowl and an outer bowl, both having openings, can be placed in slidable contact with each other. The bowls can be rotated with respect to each other so that the openings on the inner bowl align with the openings on the outer bowl. A pet owner can slide the bowls in order to create the desired effective opening size. Therefore, the pet owner can adjust the opening size according to the size of the served pet food. The effective opening size of the feeding bowl can be adjusted to completely close the openings such that liquids can also be served to the pet in the same feeding bowl. When cleaning, the openings can be set to an appropriate size so as to substantially reduce water bounce back when the feeding bowl is cleaned with a spray of water and allowing for drainage of the dirty water, thereby cleaning the bowl.

BRIEF DESCRIPTION OF THE DRAWINGS

The present invention has other advantages and features which will be more readily apparent from the following detailed description of the invention and the appended claims, when taken in conjunction with the accompanying drawings, in which:

FIGS. 1A-1B illustrate a top view and a cross-sectional view of a pet feeding bowl with an opening at the bottom covered by a convex cap;

FIGS. 2A-2B illustrate a top view and a cross-sectional view of a pet feeding bowl with an opening at the bottom and with lateral slits;

FIG. 6 illustrates a top view of a pet feeding bowl with several openings at the bottom of the feeding bowl;

FIG. 7 illustrates a cross-sectional view of a pet feeding bowl with a support structure at the bottom of the bowl;

FIG. 8 illustrates livestock/pet feeding bowls or troughs with oval openings;

FIG. 9 illustrates livestock/pet feeding bowls or troughs with rectangular openings;

FIGS. 10A-10D illustrate a pet feeding bowl with adjustable width openings.

DETAILED DESCRIPTION OF THE PREFERRED EMBODIMENTS

Figure 4:
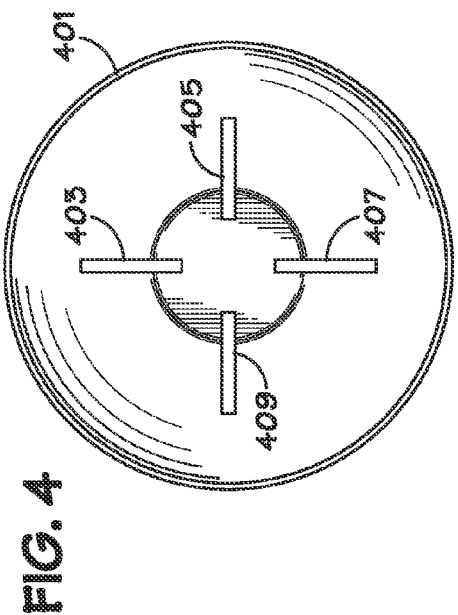
FIG. 4 illustrates a top view of a pet feeding bowl with longitudinal rectangular slits.

FIG. 1A illustrates the top view of a pet feeding bowl 101 having a substantially concave shape for holding pet food.

However, the scope of the invention is not limited to the shape of the pet feeding bowl shown in FIG. 1. The word "bowl" or "pet feeding bowl," can include structures such as deep dish, pot, urn, and vessels of any shape and size that can be used to hold animal or pet feed. For example, FIGS. 8 and 9 show a trough being used for feeding animals. The feeding bowl 101 can include an opening 103 disposed substantially at the bottom of the bowl 101. Although the opening 103 is shown to be at the center of the bowl 101, it can alternatively be positioned anywhere along the bottom of the bowl 101. Furthermore, more than one opening (of the same or varying sizes) can also be present. Bowl 101 can also include a raised convex cap 105 supported by three supporting members 107, 109, and 111. FIG. 1B illustrates a cross-section of the bowl 101 along axis 1B-1B. The raised cap 105 can be positioned by the supporting members 107, 109, and 111 (shown in FIG. 1A) such that the periphery of the raised cap 105 and the inner surface of the bowl 101 leave an opening 113. Note that the convex cap 105 in FIGS. 1A and 1B alternatively can be replaced with a cap that is substantially flat. Additionally, the cap itself can have openings to allow water, food crumbs, dirt, and debris easy passage to the opening 103.

A pet owner can place pet food (not shown) in feeding bowl 101 for feeding his/her pet either indoors or outdoors. The opening 113 formed between the convex cap 105 and the inner surface of bowl 101 can be designed such that the opening 113 allows only small food crumbs to pass through it to the bottom of the bowl 101. Therefore, pet food inside the bowl 101 is supported at the bottom by convex cap 105. After the pet has finished eating the pet food, small crumbs of pet food can be left over on the convex cap 105 or the sides of the feeding bowl 101. Small crumbs may also be present in the cavity formed by the raised convex cap 105 at the bottom of the feeding bowl 101. Additionally, pet saliva can make the food crumbs adhere to the inside of the bowl. Eventually, dirt and dust can also stick and dry on the feeding bowl's 101 inner surface and on the leftover food.

The pet owner can clean the feeding bowl 101 by spraying water into the bowl. Cleaning of the feeding bowl 101 can be carried out either indoors or outdoors. Advantageously, the design of the feeding bowl 101, as shown in FIGS. 1A-1B, can reduce or avoid the problems of both water left in the bowl needing to be dumped and of water bounce back that plagues traditional pet feeding bowls. Because of the solid and concave designs of traditional feeding bowls, the water sprayed into those bowls would invariably remain in the bowl after spraying. In addition, some water may bounce back onto the pet owner while spraying. However, to clean dirt and food crumbs from the inner surface of the feeding bowl 101, the pet owner can leave the bowl 101 on the ground, point a water hose at the inner surface of the feeding bowl 101, and begin spraying. When the pet owner sprays water into the pet feeding bowl 101, the water can pass through the cavity 113 formed between the periphery of the convex cap 105 and the inner surface of the feeding bowl 101 and exit via opening 103.

The pet owner can clean the feeding bowl 101 with the bowl remaining on the ground without having to bend down and handle the bowl to drain any accumulated water because the feeding bowl 101 can easily drain water through opening 103. In addition, when the feeding bowl 101 is left out overnight, water due to morning dew or rain can easily pass under the convex surface and out through the opening 103. Convex cap 105 can also suppress water reflection due to turbulence at opening 103. Because water and other debris can rush to the opening 103, some amount of water splashing back into the bowl may be inevitable. However, convex cap 105 can stop the water resulting from such splashing to reach the person cleaning the bowl. Therefore, the problems of water accumulation and water bounce back in traditional feeding bowls can be mitigated by using the feeding bowl 101 in FIG. 1A.

A person skilled in the art will appreciate that in an alternate embodiment the feeding bowl can include a cap, similar to the convex cap 105, whose clearance from the bottom of the feeding bowl can be adjustable. Note that if the supporting members 107, 109, and 111 can be increased in height, the convex cap 105 can be raised higher from the bottom of the feeding bowl 101. Because the effective diameter of the feeding bowl 101 increases along the height of the bowl, raising the height of the convex cap 105 can increase the size of the gap 113. Similarly, if the convex cap 113 is lowered deeper into the feeding bowl 101, then the size of the gap 113 can be made smaller. Therefore, the pet owner can adjust the height of the convex cap so that the gap 113 can be selected according to the type and size of food being served to the pet. An adjustable height convex cap 105 allows the pet owner to adjust the size of gap 113 depending on the size of the food to be served.

FIG. 2A illustrates the top view of another example of a feeding bowl 201. The feeding bowl 201 can include an opening 203 at the bottom of the bowl. The size and position of opening 203 is not limited to the one shown in FIG. 2A. The opening 203 can be placed anywhere at the bottom of the bowl 201. Also, the size of the opening 203 can be larger or smaller than the one shown in FIG. 2A. The feeding bowl 201 can also include four horizontal slits 205, 207, 209, and 211, along the circumference of the bowl 201 and can be disposed preferably close to the bottom of the bowl. FIG. 2B shows a cross-section of bowl 201 shown in FIG. 2A along axis 2B-2B. Width of slits can be designed such that it is large enough to allow water, food crumbs, and dirt to pass through, but small enough to prevent regular pet food from passing through the slits.

Horizontal slits 205, 207, 209, and 211 and opening 203 can drain any accumulation of water along with dirt and food crumbs left over inside the bowl. Advantageously, the pet owner can also clean the feeding bowl 201 by laying the feeding bowl on the ground and then spraying water into it. The pet owner does not have to bend down and handle the bowl to drain it because slits 205, 207, 209, and 211 and opening 203 provide an outlet for the water and any dirt and food crumbs. Also, in situations where the feeding bowl 201 is left outside overnight, morning dew or rain will not fill up the bowl with water and mix with dirt and food crumbs as is the case with traditional bowls. Furthermore, horizontal slits 205, 207, 209, and 211 and the opening 203 reduce the amount of water bouncing back onto the pet owner while cleaning the bowl 201. When water is sprayed onto the inner surface of the feeding bowl 201, opening 203 and slits 205, 207, 209, and 211 provide an outlet for the water and any food crumbs, dirt and debris.

Figure 3B:
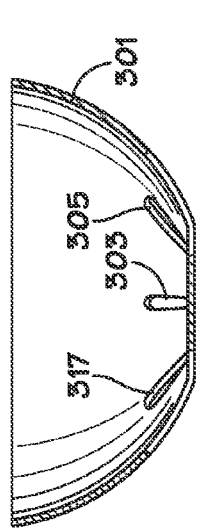
FIGS. 3A-3B illustrate a top view and a cross-sectional view of a pet feeding bowl with longitudinal slits.
Figure 3A:
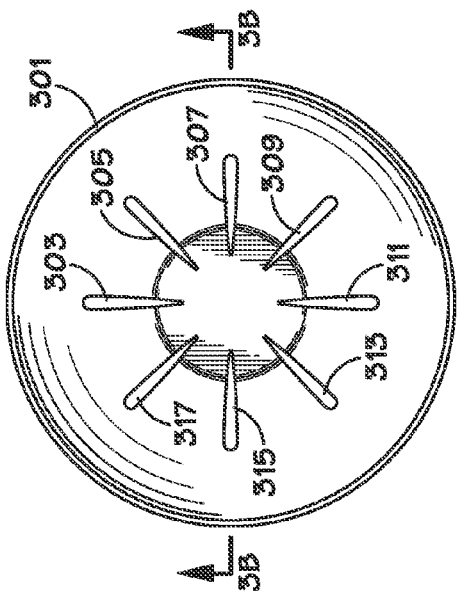

FIGS. 3A and 3B illustrate additional examples of feeding bowls with longitudinal slit openings. For example, FIG. 3A shows a top view of feeding bowl 301 with eight longitudinal slits 303, 305, 307, 309, 311, 313, 315, and 317. FIG. 3B shows a cross-section of the feeding bowl 301 along axis 3B-3B. Slits 317, 303, and 305 can be seen extending upwards from the bottom of the feeding bowl 301. Similarly, FIG. 4 shows a top view of a feeding bowl 401 with four longitudinal slits 403, 405, 407, and 409. While the longitudinal slits in FIG. 3A can be tapered at the bottom of the bowl, the longitudinal slits in FIG. 4 can have constant width. Note that the pet food will predominantly lie at the bottom of the feeding bowl 301. The tapering of the slits at the bottom of the feeding bowl, as shown in FIGS. 3A-3B can prevent food placed in the bowl from passing through the openings, while wider openings at the upper end of the slits can enable water, food crumbs, and dirt to easily drain out of the bowl. In situations where preventing pet food from dropping through the slits is not a concern, constant width longitudinal slits, as depicted in the example shown in FIG. 4, can be used instead.

Note that in each of the examples shown in FIGS. 3A and 4, the bottom of the feeding bowl can be without an opening that was shown in FIGS. 1A and 2A. However, an opening can be easily accommodated if additional draining is needed. The slits in FIGS. 3A and 4 can also be oriented at an angle. For example, instead of the slits extending upwards in a longitudinal manner, the slits can instead extend upwards at an angle with the longitude. For example, slit 303 can be made to extend at an angle to the left or right of the orientation shown in FIG. 3B. The remaining slits can be arranged in a similar manner. Having the slits at an angle can allow larger effective slit surface area while at the same time keeping the vertical extent to which the slits extend to be the same.

Figure 5:
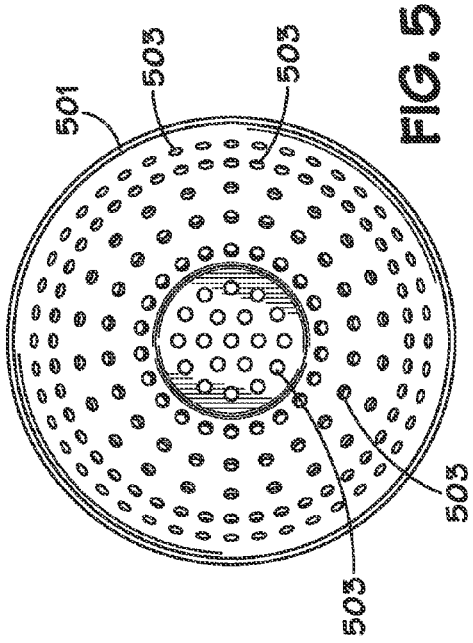
FIG. 5 illustrates a top view of a pet feeding bowl with a plurality of openings distributed throughout the surface of the bowl.

FIG. 5 discloses another example of a feeding bowl 501 having numerous small openings disposed throughout the surface of the feeding bowl 501. Having a plurality of openings 503 distributed throughout the surface of the feeding bowl 501 can increase the draining capacity of the feeding bowl. Therefore when the pet owner washes the feeding bowl 501 with a spray of water, the quick drainage provided by openings 503 allows the draining water to carry away dirt and other particles without the pet owner handling the bowl. The size of the openings 503 can be designed such that they do not allow pet food that is to be fed to the pet to drop out through the openings, while at the same time allowing food crumbs, dirt, and debris along with water to easily drain through them. FIG. 6 provides another alternative where the openings 603 are disposed only at the bottom of the feeding bowl 601.

FIG. 7 shows a cross-section of feeding bowl 701 disposed on a support structure 703. Support structure 703 can serve at least two purposes. First, it can provide stability to the feeding bowl 701. Second, it can provide appropriate elevation to the feeding bowl 701 such that the openings 705, 707, 709, and particularly opening 711 have enough clearance from the ground in order effectively drain out water and/or dirt from the inside of the feeding bowl 701. The support structure 703 can be an inverted hollow conic section where the narrow end 713 is affixed to the curved bottom of the feeding bowl 701. The wider end 715 provides stability to the bowl 701. Alternatively, the support section can be made up of a plurality of legs for providing stability and elevation. Support structure 703 can also be used to provide elevation and stability to examples shown in FIGS. 1A-6, and 10A-10D.

FIG. 8 depicts an exemplary feeding trough 801 that can be used for feeding pets or livestock. Trough 801 can have a rectangular opening where each side of the rectangular opening is formed by sides 803, 805, 807, and 809. Sides 803 and 805 are rectangular in shape, while sides 807 and 809 are triangular in shape. However, sides 803, 805, 807, and 809 are not limited by the specific shapes shown in FIG. 8. Furthermore, one or more of these sides can be curved instead of being flat. All four sides converge at edge 811 to form a hollow enclosure. Bottom of the trough 801, along the edge 811 and the two sides 803 and 805, can have a series of openings 813. The whole structure is supported by four support structures 815, 817, 819, and 821. The size of openings 813 can be designed such that they do not allow livestock/pet food to drop to the ground through the openings, while at the same time allowing food crumbs, dirt and debris along with water to easily drain through them.

The design of trough 801 shown in FIG. 8 can allow for cleaning the trough 801 without the cleaner having to handle the trough and while reducing the amount of water bouncing back onto the cleaner. Typically, the pet/livestock owner can fill the trough 801 with food for the consumption by the pet/livestock. After the food has been consumed, the trough 801 can suffer from the familiar problem of having dried food crumbs, dirt, and debris stuck to the inner surfaces. However, unlike traditional troughs, which have to be sprayed and then tipped over to drain the water or first tipped over and then sprayed (easily resulting in water bounce back), the trough 801 of FIG. 8, would drain the sprayed water through the openings 813. Further, because the internal surfaces are angled downward, spraying water on the surface will result in the water being reflected primarily downward, and not outside the trough. If the inner surface of the trough 801 accumulates morning dew or if it is left in the rain, water will naturally slide downward to the openings 813 and drain out of the trough 801, naturally carrying with it left over food crumbs, dirt, debris, etc. FIG. 9 discloses another example where the trough 801 has rectangular shaped openings 913 instead of oval/round openings 813 of FIG. 8.

FIG. 10A-10D illustrate various views of an example of a pet feeding bowl with adjustable openings. FIG. 10A shows a portion of a feeding bowl 1001 that can have two concentric bowls 1003 and 1005. Outer surface of inner bowl 1005 can be in slideable contact with the inner surface of the outer bowl 1003. Both the outer bowl 1003 and the inner bowl 1005 can have a number of openings. For example, FIG. 10A shows that the outer bowl 1003 can have two horizontal rows of openings 1007 and the inner bowl 1005 can also have two horizontal rows of openings 1009. Both outer and inner bowls 1003 and 1005 can also include tabs 1011 and 1013, respectively. Outer bowl 1003 can have an opening 1015 to allow tab 1013 of the inner bowl 1005 to extend out of the outer bowl 1003. Tabs 1011 and 1013 can aid in sliding bowls 1003 and 1005 to a desired position relative to each other.

FIG. 10B illustrates a partial cross-section of the feeding bowl 1001 shown in FIG. 10A. FIG. 10B shows the inner portion of the inner bowl 1005 having two horizontal rows of openings 1009. FIG. 10C shows a partial top view of feeding bowl 1001 and a cross section along the axis 10C-10C in FIG. 10B. Tabs 1011 and 1013 can be moved closer or away from each other in order to slide the inner and outer bowls 1005 and 1003 concentrically sideways with respect to each other. In the example shown in FIG. 10C, tabs 1011 and 1013 are in a position such that openings 1007 on the outer bowl 1003 are completely misaligned with openings 1009 on the inner bowl 1005. In other words, openings 1007 on the outer bowl 1003 are blocked by the surface of the inner bowl 1005 and openings 1009 on the inner bowl 1005 are blocked by the inner surface of the outer bowl 1003. In effect, such a configuration can obstruct the flow of any solid or liquid from inside of the bowl 1001 to the outside. FIG. 10D shows another position of the tabs 1011 and 1013 such that the openings 1007 of the outer bowl 1003 are aligned with the openings 1009 of the inner bowl 1005. In this position, the feeding bowl has the largest effective opening area for allowing flow of solids of appropriate size and shape and liquids from inside the feeding bowl 1001 to the outside. Positioning the tabs 1011 and 1013 between the positions shown in FIG. 10C and FIG. 10D can result in partial alignment of the openings 1007 of the outer bowl 1003 and openings 1009 of the inner bowl 1005. Thus, the desired effective opening area for the bowl 1001 can be controlled by positioning the tabs 1011 and 1013 accordingly The pet owner can position tabs 1011 and 1013 such that the openings do not allow pet food to fall out of the feeding bowl 1001. When the pet owner needs to clean the feeding bowl 1001 with a spray of water, the pet owner can re-adjust the tabs 1011 and 1013 to get maximum effective opening. This way, feeding bowl 1001 can have maximum allowable drainage to carry away dirt and other particles without requiring the pet owner to handle the feeding bowl. Furthermore, the openings can reduce water bouncing or reflecting back to the pet owner. Furthermore, because the openings can be completely blocked, the pet owner can also feed pet food that contains liquid, without worrying about the food leaking out of the feeding bowl 1001. After the pet is done consuming the pet food, the pet owner can adjust the tabs 1011 and 1013 to realign the openings 1007 and 1009 not only to drain out any leftover liquids, but to drain out water being sprayed to clean the feeding bowl 1001.

A person skilled in the art will appreciate that several teachings of the examples shown in FIGS. 1A-10 can be combined with each other. For example, feeding bowl 101 of FIG. 1A can additionally include horizontal slits 205, 207, 209, and 211 shown in FIG. 2A or the vertical slits shown in FIGS. 3A and 4. Furthermore, feeding bowl 101 in FIG. 1A can also include several openings 503 shown in FIG. 5. Similarly, livestock/pet feeding troughs can also include additional openings, such as horizontal and vertical slits shown in FIGS. 2A, 3A and 4. As another example, feeding bowl with adjustable opening shown in FIG. 10A can be adapted to include opening 103 and a raised convex cap 105 shown in FIG. 1A.

Although one or more examples herein have been described with respect to feeding pets or livestock, a person skilled in the art will appreciate that these examples can be similarly applied to feeding any animal.

The above description is illustrative and not restrictive. Many variations of the invention will become apparent to those skilled in the art upon review of this disclosure. The scope of the invention should therefore be determined not with reference to the above description, but instead with reference to the appended claims along with their full scope of equivalents.

What is claimed is:

1. A device for feeding animals comprising:
   a first bowl having a first bottom region;
   a first opening defined in the first bottom region;
   at least one support member disposed on the first bowl; and
   a cap disposed on the at least one support member and disposed over the first opening;
   wherein the cap defines a gap with the inner surface of the first bowl for allowing water and debris to drain out of the opening.

2. The device of claim 1, wherein the cap is convex.

3. The device of claim 1, wherein the at least one support member is extendible so that the size of the gap is adjustable.

4. The device of claim 1, further comprising a support structure disposed at the bottom of the outer surface of the first bowl to provide elevation and stability to the first bowl.

5. The device of claim 1, further comprising:
   a second bowl having a second bottom region, the second bowl concentric to the first bowl, wherein the outer surface of the second bowl is in slideable contact with the inner surface of the first bowl;
   a second opening defined in the second bottom region;
   a plurality of first lateral openings defined on the first bowl's lateral surface; and
   a plurality of second lateral openings defined on the second bowl's lateral surface;
   wherein sliding the first bowl with respect to the second bowl varies the overlap between at least one of the plurality of first lateral openings and one of the plurality of second lateral openings.

6. The device of claim 1, wherein the first bowl comprises a plurality of longitudinal slits extending at least partially onto the first bottom region.

7. The device of claim 6, wherein at least one of the plurality of longitudinal slits has a constant width.

8. The device of claim 6, wherein at least one of the plurality of longitudinal slits is tapered at an end that extends onto the first bottom region.

9. The device of claim 1, wherein the first bowl comprises a plurality of openings distributed throughout the surface of the first bowl.

10. A method of feeding animals comprising:
    providing animal food to the animal in a feeding device comprising:
      a first bowl having a first bottom region;
      a first opening defined in the first bottom region;
      at least one support member disposed on the first bowl; and
      a cap disposed on the at least one support member and disposed over the first opening;
      wherein the cap defines a gap with the inner surface of the first bowl for allowing water and debris to drain out of the opening.

11. The method of claim 10, wherein the cap is convex.

12. The method of claim 10, wherein at least one support member is extendible so that the gap size is adjustable.

13. The method of claim 10, the feeding device further comprising:
    a support structure disposed at the bottom of the outer surface of the first bowl to provide elevation and stability to the first bowl.

14. The method of claim 10, the feeding device further comprising:
    a second bowl having a second bottom region, the second bowl concentric to the first bowl, wherein the outer surface of the second bowl is in slideable contact with the inner surface of the first bowl;
    a second opening defined in the second bottom region;
    a plurality of first lateral openings defined on the first bowl's lateral surface; and
    a plurality of second lateral openings defined on the second bowl's lateral surface;
    wherein sliding the first bowl with respect to the second bowl varies the overlap between at least one of the plurality of first lateral openings and one of the plurality of second lateral openings.

15. The method of claim 10, wherein the first bowl comprises a plurality of longitudinal slits extending at least partially onto the first bottom region.

16. The method of claim 15, wherein at least one of the plurality of longitudinal slits has a constant width.

17. The method of claim 15, wherein at least one of the plurality of longitudinal slits is tapered at an end that extends onto the first bottom region.

18. The method of claim 10, wherein the first bowl comprises a plurality of openings distributed throughout the surface of the first bowl.

* * * * *